April 7, 1959     H. H. HOGE ET AL     2,881,314
NULL DETECTOR
Filed July 16, 1956
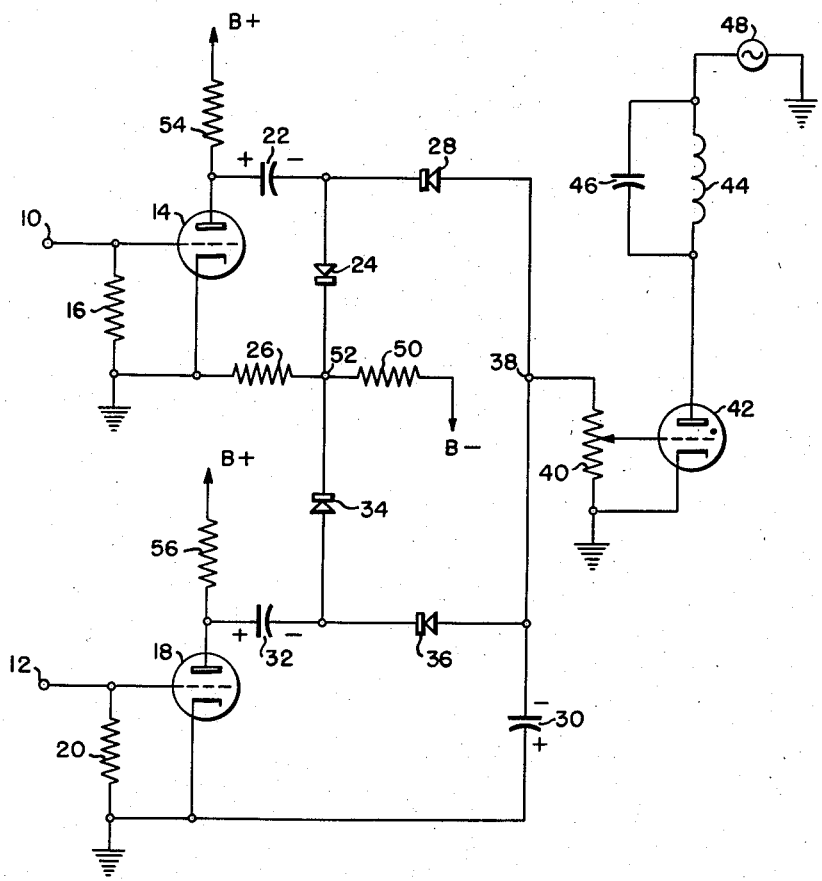
WITNESSES
INVENTORS
Henri H. Hoge &
James E. Holthaus
BY
ATTORNEY United States Patent Office 2,881,314
Patented Apr. 7, 1959

2,881,314

NULL DETECTOR

Henri H. Hoge, Baltimore, and James E. Holthaus, Catonsville, Md., assignors to Westinghouse Electric Corporation, East Pittsburgh, Pa., a corporation of Pennsylvania Application July 16, 1956, Serial No. 597,996

5 Claims. (Cl. 250—27)

This invention relates to devices for detecting a null with respect to two separate input signals and, more particularly, to a device for detecting a null condition in all of a plurality of alternating current signals.

It is an object of this invention to provide circuit means, responsive to a plurality of alternating current signals, which will prevent a relay or other electrical utilization device from operating in the presence of any one of the aforesaid signals, regardless of the phase relationship of these signals.

Another object of the invention resides in the provision of a null detector of the type described above in which voltages in the null region are doubled, thereby increasing the sensitivity of the circuit.

A still further object of the invention is to provide circuit means for producing a direct current output signal which is proportional to the sum of the instantaneous voltage amplitudes of a plurality of alternating current input signals.

The above and other objects and features of the invention will become readily apparent from the following detailed description taken in connection with the accompanying single figure drawing which illustrates the invention in schematic circuit form.

Referring now to the drawing, two sources of alternating current voltage, not shown, are applied to input terminals 10 and 12 respectively. The input signals on terminal 10 are applied between the grid and cathode of a class C amplifier 14 by means of grid resistor 16; whereas the signals on terminal 12 are applied between the grid and cathode of a similar class C amplifier 18 by means of grid resistor 20.

The plate circuit for amplifier 14 is divided into two current paths, one of which includes capacitor 22, rectifier 24, and resistor 26, and the other of which includes the capacitor 22, a rectifier 28 and a capacitor 30, one terminal of which is grounded. In a similar manner, the plate circuit of the amplifier 18 is divided into one current path including capacitor 32, rectifier 34 and the resistor 26, and a second current path including capacitor 32, a rectifier 36 and the capacitor 30.

The junction 38 of rectifiers 28 and 36 is connected through resistor 40 to ground; and this resistor acts as a grid resistor for a thyratron, generally indicated at 42. The plate circuit of thyratron 42 includes a relay coil 44, shunted by capacitor 46, and a source of alternating current voltage 48. Resistor 50, having one terminal connected to junction 52 and the other terminal connected to a source of negative voltage, provides an approximate —1 volt bias across the resistor 40. Any signal present at either input increases the bias from this point.

It can readily be seen that the plate circuit for each of the amplifiers 14 and 18 constitutes a voltage doubler. On the first or negative half cycle of input voltage applied to terminal 10, amplifier 14 will not conduct. Consequently, capacitor 22 will be charged from the plate supply for amplifier 14 with the polarity shown through resistor 54, rectifier 24, and resistor 26. On the next or positive half cycle when amplifier 14 conducts, the capacitor 22 will discharge through rectifier 28 and capacitor 30. Consequently, the negative voltage at point 38 is increased. Likewise, on the first or negative half cycle of a signal applied to input terminal 12, capacitor 32 will be charged from the plate supply of amplifier 18 with the polarity shown through resistor 56, rectifier 34 and resistor 26. On the next half cycle when amplifier 18 conducts, capacitor 32 will be discharged through rectifier 36 and capacitor 30, thereby further increasing the negative voltage at point 38. When the negative voltage at point 38 reaches a predetermined magnitude, thyratron 42 will be cut off and the relay coil 44 will be deenergized. When the negative voltage at point 38 is removed, however, the source of alternating current plate voltage 48 will cause the thyratron 42 to conduct immediately. Capacitor 46 is used in an obvious manner to filter the rectified voltage appearing across relay coil 44 once thyratron 42 has fired.

Since capacitor 30 is the doubling capacitor for the voltage doubler in each of the plate circuits, thyratron 42 can be cut off in the presence of a signal on terminal 10 alone, in the presence of a signal on terminal 12 alone, or in the presence of signals on both of terminals 10 and 12. It will also be noted that the phase of the signals applied to terminals 10 and 12 is immaterial since the voltage build up on capacitor 30 is cumulative.

Although the invention has been described in connection with a certain specific embodiment, it should be readily apparent to those skilled in the art that various changes in form and arrangement of parts may be made to suit requirements without departing from the spirit and scope of the invention.

We claim as our invention:

1. In combination with two sources of alternating current voltage having a common output terminal, each of said voltage sources having an uncommon output terminal, circuit means for actuating a relay when the sum of the voltage levels of said signal sources falls below a predetermined amplitude and comprising, in combination, a first current path including a rectifier and a capacitor in series connecting said common terminal and the uncommon terminal of said first voltage source, a second current path including a rectifier and a capacitor in series connecting said common terminal and the uncommon terminal of said second voltage source, a pair of rectifiers in series connecting the junction of the rectifier and capacitor in said first current path to the junction of the rectifier and capacitor in said second current path, a capacitor and a resistor in parallel connecting the junction of said last-named rectifiers to said common terminal, an electron discharge device having an anode, cathode and control electrode included therein, means for applying at least a portion of the voltage developed across said resistor between the control electrode and cathode of said electron discharge device, and means including said relay and a source of alternating current voltage connecting the anode and cathode of said electron discharge device.

2. In combination with two sources of alternating current voltage having a common output terminal, each of said voltage sources having an uncommon output terminal, circuit means for producing an output voltage proportional to the sum of the amplitudes of a plurality of alternating current voltage sources and comprising, in combination, a first current path including a rectifier and a capacitor in series connecting said common terminal and the uncommon terminal of said first voltage source, a second current path including a rectifier and a capacitor in series connecting said common terminal and the uncommon terminal of said second voltage source, a pair of rectifiers in series connecting the junction of the rectifier and capacitor in said first current path to the junction of the rectifier and capacitor in said second current path, and a capacitor and a load resistor in parallel connecting the junction of said last-named rectifiers to said common terminal.

3. Circuit means for producing a direct current output voltage the magnitude of which is proportional to the sum of the voltage amplitudes of two alternating current voltage sources comprising, in combination, a pair of output terminals for each of said voltage sources, one of the output terminals of each voltage source being common with a corresponding output terminal of the other voltage source, a first current path including a capacitor and a unidirectional current device connecting the uncommon terminal of one of said voltage sources to said common terminal, a second current path including a capacitor and a unidirectional current device connecting the uncommon terminal of the other of said voltage sources to said common terminal, a unidirectional current path including an impedance element connecting the junction of the capacitor and unidirectional current device in said first current path to said common terminal, and another unidirectional current path including the aforementioned impedance element connecting the junction of the capacitor and unidirectional current device in said second path to said common terminal, whereby the voltage appearing across said impedance element will be proportional to the sum of the voltage amplitudes of said alternating current voltage sources.

4. Circuit means for producing a direct current output voltage the magnitude of which is proportional to the sum of the voltage amplitudes of two alternating current voltage sources comprising, in combination, a pair of output terminals for each of said voltage sources, one of the output terminals of each voltage source being common with a corresponding output terminal of the other voltage source, a first unidirectional current path including a capacitor connecting the uncommon terminal of one of said voltage sources to said common terminal, a second unidirectional current path including a capacitor connecting the uncommon terminal of the other of said voltage sources to said common terminal, a third unidirectional current path including an impedance element connecting a point in said first unidirectional current path to said common terminal, and a fourth unidirectional current path including the aforementioned impedance element connecting a point in said second unidirectional current path to said common terminal, whereby the voltage appearing across said impedance element will be proportional to the sum of the voltage amplitudes of said alternating current voltage sources.

5. Circuit means for producing a direct current output voltage the magnitude of which is proportional to the sum of the voltage amplitudes of two alternating current voltage sources comprising, in combination, a pair of output terminals for each of said voltage sources, one of the output terminals of each voltage source being common with a corresponding output terminal of the other voltage source, a first current path including a capacitor and a unidirectional current device connecting the uncommon terminal of one of said voltage sources to said common terminal, a second current path including a capacitor and a unidirectional current device connecting the uncommon terminal of the other of said voltage sources to said common terminal, a unidirectional current path including a load impedance connecting the junction of the capacitor and the unidirectional current device in said first current path to said common terminal, another unidirectional current path including the aforementioned load impedance connecting the junction of the capacitor and the unidirectional current device in said second current path to said common terminal, and a capacitor connected in parallel with said load impedance.

References Cited in the file of this patent

UNITED STATES PATENTS

| | | |
|---|---|---|
| 2,072,278 | Schade | Mar. 2, 1937 |
| 2,454,807 | Kennedy | Nov. 30, 1948 |
| 2,710,368 | Wylie | June 7, 1955 |
| 2,751,555 | Kirkpatrick | June 19, 1956 |
| 2,780,724 | Fickett | Feb. 5, 1957 |
| 2,781,478 | Cooke | Feb. 12, 1957 |